United States Patent [19]

Furrer et al.

[11] 4,324,972
[45] Apr. 13, 1982

[54] PROCESS AND DEVICE FOR LASER-BEAM MELTING AND FLAME CUTTING

[75] Inventors: Alfred Furrer; Hans Wehrli, both of Winterthur, Switzerland

[73] Assignee: Laser-Work A.G., Winterthur, Switzerland

[21] Appl. No.: 207,926

[22] Filed: Nov. 18, 1980

[51] Int. Cl.³ .............................................. B23K 27/00
[52] U.S. Cl. ........................ 219/121 FS; 219/121 LC; 219/121 LG; 219/121 LH; 219/121 LK; 219/121 LR
[58] Field of Search .................. 219/121 FS, 121 LC, 219/121 LD, 121 LE, 121 LF, 121 LG, 121 LJ, 121 LH, 121 LK, 121 LL, 121 LN, 121 LM, 121 LR, 121 LV

[56] References Cited
U.S. PATENT DOCUMENTS

| | | | |
|---|---|---|---|
| 3,569,660 | 3/1971 | Houldcroft | 219/121 FS X |
| 3,626,141 | 12/1971 | Daly | 219/121 LH |
| 3,679,863 | 7/1972 | Houldcroft et al. | 219/121 FS X |
| 4,027,137 | 5/1977 | Liedtke | 219/121 LR X |

FOREIGN PATENT DOCUMENTS 131543 10/1979 Japan ............................. 219/121 FS

*Primary Examiner*—C. L. Albritton
*Attorney, Agent, or Firm*—Silverman, Cass & Singer, Ltd.

[57] ABSTRACT

In a laser beam cutting device the focussing of the laser beam (1) and the adjustment of the focal spot (4) in respect of its vertical position is made swing free, and is achieved without subsequent correction of the workpiece coordinates, with the focussing lens (2) guided strictly parallel and coaxial with the optical axis. By active cooling of the surface of the workpiece in the immediate area of the focal spot (4), the critical heating-up zone is reduced and the accuracy and surface finish of the cut edge is improved.

6 Claims, 5 Drawing Figures

PROCESS AND DEVICE FOR LASER-BEAM MELTING AND FLAME CUTTING

This invention relates to a process for laser beam melting and flame cutting and to a device therefor. It is particularly concerned with such a method and device wherein a laser beam is produced, guided and by means of a lens focussed and projected on to the surface of the workpiece to be treated, with an inert or reactive gas being fed coaxially of the laser beam to the focal spot so produced.

The machining of mainly laminar workpieces using laser beams is a continually growing branch of production technology for the profiling of metals, plastics and woods, etc. Thus, to a certain degree influenced by the well-known oxyacetylene gas welding and cutting technique, a laser beam guided by an optical system is focussed on to the surface of the workpiece and the material to be machined is locally heated in such a way that it melts, vaporises or is burnt. Usually, the focussing of the laser beam is accomplished with a concave mirror or a lens and, coaxially with the beam cone, a usually similarly cone-shaped nozzle is arranged to feed the inert or reactive gas on to the surface of the workpiece. The method and the device are known from different publications (for example, VDI-Z 199 (1977) No. 20 October, page 967 et seq).

An important prerequisite for trouble free operation with the laser beam process is, in one respect, the greatest possible freedom for the positioning of the focussing point with reference to the workpiece and, in another respect, the greatest possible reduction in the workpiece heating-up zone. These requirements are inadequately met with conventional devices.

One seeks to meet the first requirement by turning the lens for height adjustment, with a mounted threaded ring. As a result of the asymmetry of the lens and its mounting, as well as what is known in the trade as "play" in the lens mounting, the position of the axis of the laser beam is altered, and subsequent adjustment and setting up of the apparatus is unavoidable. Otherwise, as a result of incidence and reflection of the laser beam on the inner wall of the nozzle, the beam energy is partially dissipated and accurate focussing on to the surface of the workpiece is made impossible. The second requirement is, in the main, not met so that sharp-edged corners in the plan form of the workpiece cannot usually by executed accurately because of the localisation of heat.

The invention has for an object to provide a process as well as a device to make possible the movement of the focal point (focal spot) of the laser beam, relative to the surface of the workpiece, relative to the nozzle and relative to the supporting feet or the height scanner or another suitable reference point, in a simple manner, in the direction of the laser beam axis without readjustment with respect to the workpiece coordinates.

A further object of the invention is to indicate how the spread of the heating-up zone of the workpiece can be reduced, and especially how the localisation of heat at critical points can be avoided. This object is achieved in a process or device in accordance with the invention by employing the preferred features recited in the appendant claims 3, 4, 9 and 10.

The invention will now be described in more detail with reference to the accompanying drawings, which are given by way of example. In the drawings.

Figure 1:
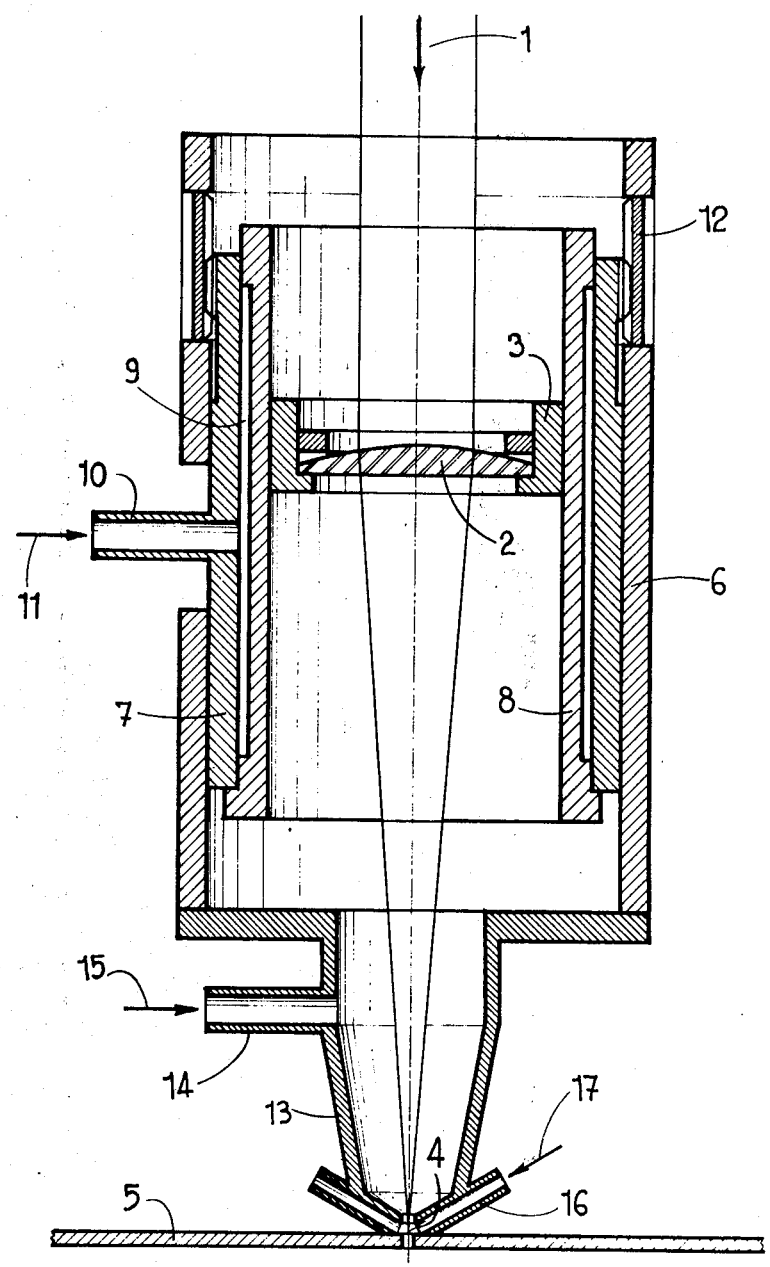
FIG. 1 is a schematic longitudinal section through a laser beam device in accordance with the invention.

In FIG. 1 the schematic longitudinal sectional view illustrates a laser beam device particularly suitable for melting and flame cutting. A focussing lens 2 in a lens mounting 3 concentrates the incoming laser beam 1 at a focal spot 4 in the area of the surface of the workpiece 5 which, in the present case, is for example flat sheet metal. In a housing 6 there is arranged a sliding body, coaxial with the laser beam and consisting of an outer shell 7 and an inner shell 8, which is movable in the longitudinal direction of the laser beam 1 relative to the housing 6. In between the two tightly sealed shells 7 and 8, placed one inside the other, there is a coolant channel 9 for cooling the lens, through which channel flows a liquid or a gas type coolant 11 and which is fed via a coolant connection 10 whereby the latter can, at the same time, serve as a guiding connection piece in a corresponding slot in the housing 6. The coolant channel 9 can be formed as a circular ring channel or it can consist of longitudinal axial grooves or slots, or else be formed in another manner. As the coolant 11, water is for preference used. In the housing 6 there is located an adjusting ring 12, in the form of a threaded ring, the internal screw thread of which engages the mating outer screw thread of the outer shell 7. By turning the adjusting ring 12 the shell assembly structure 7,8 and with it the focussing lens 2 can be moved relative to one of the accepted reference points, parallel to the longitudinal axis of the laser beam 1, without the focussing lens being thereby tilted. On a lower flange of the housing 6 there is a connection 14 for gas supply to the nozzle 13. As the gas 15, according to the nature of the intended process, an inert gas (Ar, $N_2$) or a reactive gas ($O_2$) can be used. On the lower part of a nozzle 13 there is a coolant connection 16 for workpiece cooling. The connection 16 is such that the coolant 17, for cooling the workpiece surface 5, will be fed concentrically towards the latter in the immediate proximity of the focal spot 4. Accordingly, the connection 16 can consist of several tubes lying on a conical envelope, or be formed as a cone-shaped ring channel whereby the tip of the virtual cone lies in the focal spot. As the coolant 17, mainly a gas type or liquid is used, preferably water.

Figure 2:
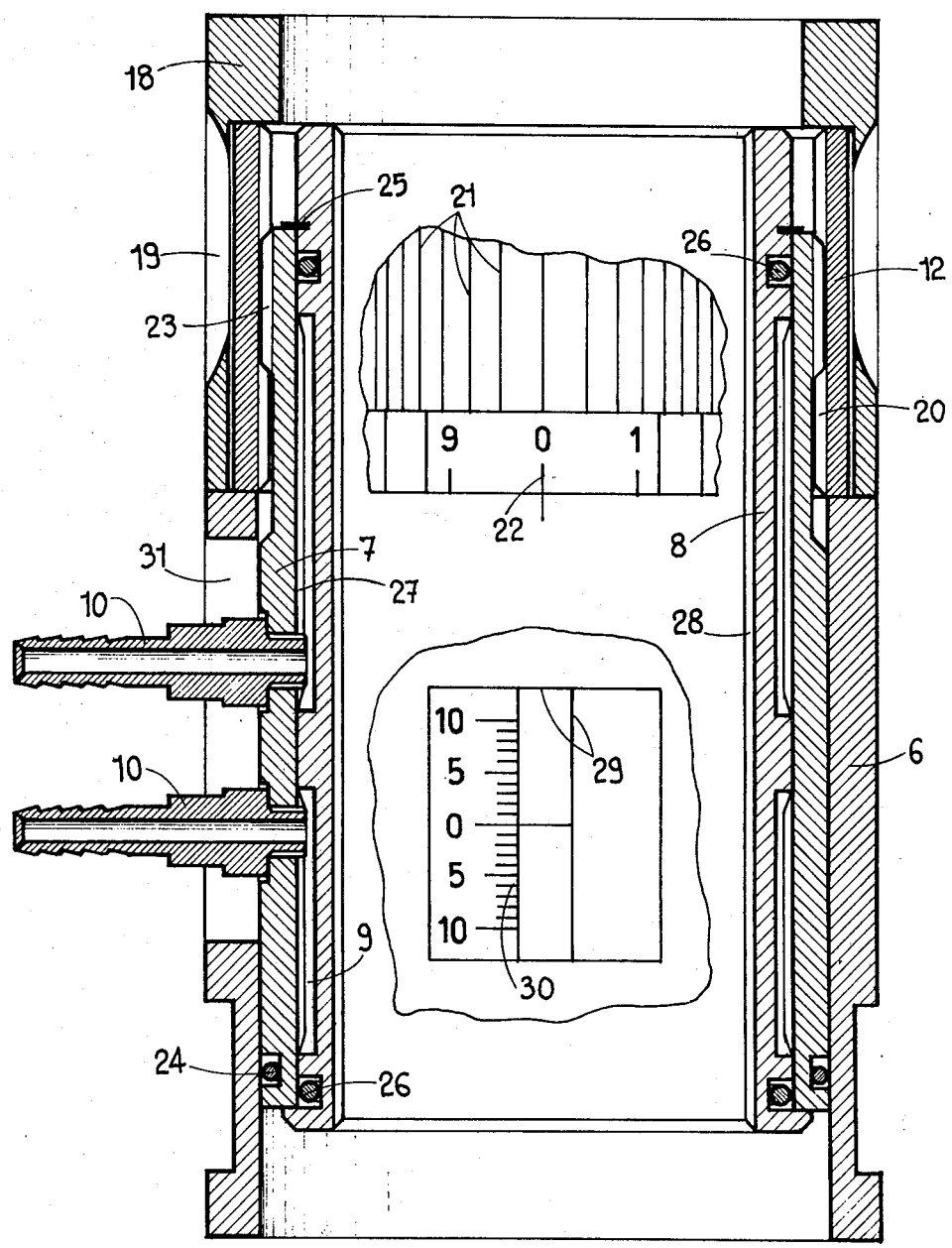
FIG. 2 is a longitudinal section through the optical part of a laser beam cutting head in accordance with the invention.

FIG. 2 shows a longitudinal section through a practical embodiment of the optical part of a laser beam cutting head, which contains the movable lens 2 from FIG. 1 (not shown here). The housing is made in two parts and consists of the actual housing 6 and the upper part of the housing 18, which are held together by six screws, not here shown (preferably hexagonal socket head screws, parallel to the optical axis). The components 6 and 18 have for preference an internal circular section and an outer square section, but they can fundamentally have optionally polygonal or partly polygonal, partly circular or elliptical contact section. Generally, these components will be made from aluminum alloys, in order to save weight and reduce machining costs. The housing 6, for the purpose of a more rigid parallel construction of shells 7 and 8 and, at the same time for receiving the coolant connection 10 serving as a feed connection piece, is provided with a guide slot 31. Further, it has a right-angled cut-out 29 for a graduated scale 30, on which the relative position of the shells 7,8 can be read. The housing upper part 18 has on opposite sides two diametrically opposed cut-outs 19 through which the adjusting ring 12 axially located in 18 can be turned by hand, for this purpose the ring having a knurled periphery. The relative position of the ring 12 can be read off on a scale 22 opposite a fixed mark in the housing 6. The adjusting ring 12 has an internal thread 20, which the mating external screw thread 23 of the outer shell 7 engages. The latter is sealed relatively to the housing 6 by means of a sealing ring 24 (preferably an O-ring). For preference the ring 12 is made from brass (chromed) and the shell 7 from corrosion resistant steel. At the upper end the outer shell 7 is retained by an end ring 25 (Seeger ring). The fit between the housing 6 and the outer shell 7 is such that the latter can be moved by hand, while well sealed, in the axial direction by means of the adjusting ring 12 (preferably H7). The inner shell 8 which houses a sealing ring 26 (O-ring) has on its outer circumference the coolant channel 9, which in the present case is formed as a meandering slot 27, with straight portions lying on a gneratrix interconnected by arc-shaped portions disposed progressively around the circumference. This coolant channel can also have other shapes, for example parallel slots or screw-shaped grooves. The inner shell 8 is provided on its inner surface with a continuous inner thread 28 for the purpose of fixing the lens 2 with the lens mounting 3 (FIG. 1). This allows lenses of different focal lengths to be fitted, without having to adjust the incoming laser beam 1 (FIG. 1). Fine adjustment is achieved by means of the adjusting ring 12. For preference the inner shell 8 is likewise made of aluminium alloy. The construction shown here refers to hollow cylindrical shells 7 and 8. This circular cross-section is not, however, the only practicable form and of course it can also be made from square, hexagonal, octagonal or other section (for example straight and circular arcs connected together) whereby, however, the engaging screw thread principle is retained at the respective places (20 and 23).

Figure 3:
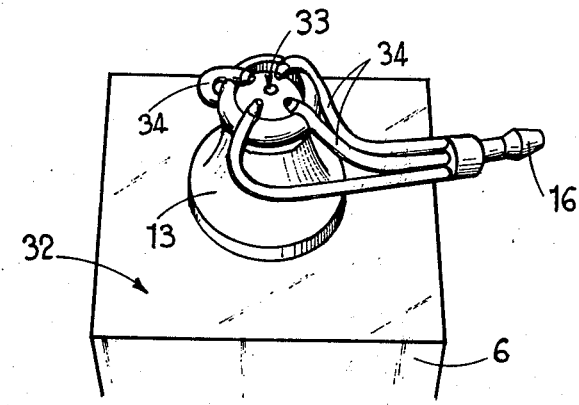
FIG. 3 is a perspective view of a nozzle assembly of the cutting head with four supply tubes for the workpiece coolant.

FIG. 3 shows a perspective view (turned over from the working position) of a nozzle assembly of a laser beam cutting head with four feed pipes for the workpiece coolant 17 (according to FIG. 1). On the housing 6 there sits a nozzle flange 32, which supports the actual nozzle 13 with the nozzle opening 33 for the laser beam and the exhaust of the inert or reactive gas (refer to FIG. 1). The coolant connection 16 for cooling the workpiece supplies the four feed pipes 34 for the coolant streams which lie on a virtual conical envelope, the apex of which is located in the focal spot (see FIG. 1). In this way the coolant streams are projected concentrically on to the surface of the workpiece in the immediate proximity of the focal spot 4. Of course, the arrangement can be carried out with a different number of feed pipes 34 (for example 1, 2, 3, 6, 8, etc. ). The choice depends mainly on the laser performance and the thickness of the workpiece.

Figure 4:
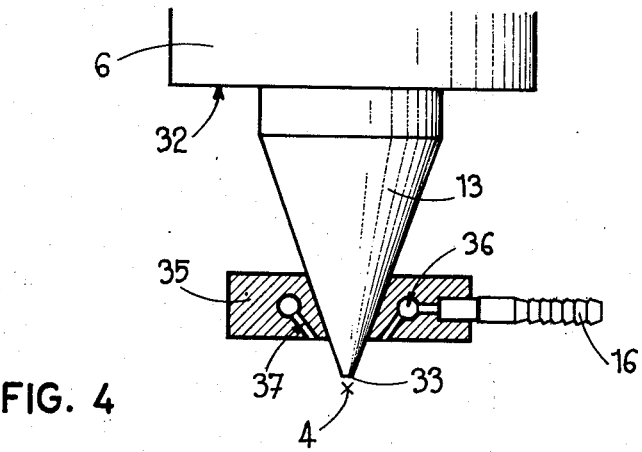
FIG. 4 is a diagrammatic and partial longitudinal cross-section through a nozzle assembly with a conical nozzle for the workpiece coolant.

In FIG. 4 a diagrammatic view is shown, partially in longitudinal section, of another construction of nozzle assembly with a conical nozzle. The nozzle 13 is on the one hand connected rigidly and in a gas-tight manner in the housing 6 with nozzle flange 32, and on the other hand presents the nozzle orifice 33. The laser beam 1 (see FIG. 1) not shown here, produces on the workpiece 5 the focal spot 4 shown in FIG. 1. Concentric with the nozzle axis a ring 35 for the coolant feed is arranged, into which the coolant connection 16 delivers. In the ring 35 a toroidal-shaped circular channel 36 for the coolant 17 (refer to FIG. 1) is formed. This extends in the direction towards the focal spot in a conical nozzle 37 to produce a cone-shaped coolant haze, which feeds concentrically on to the workpiece surface at the focal spot 4.

Figure 5:
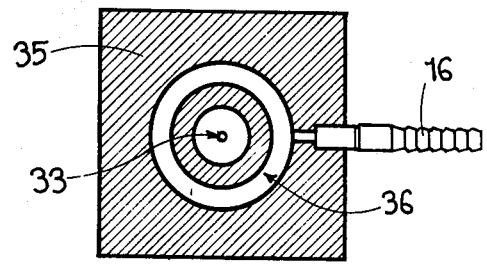
FIG. 5 is a cross-section through the cone nozzle ring of FIG. 4.

FIG. 5 shows a cross-section through the ring 35 of the cone nozzle 37 of FIG. 4. The remaining reference points correspond to FIG. 4 and are self-explanatory.

The vertical method of working illustrated is also valid for inclined use. In practice the device is successfully used, for example, for drilling or finish-machining at angles of up to ±80° with respect to one of the aligned normal lines on the workpiece.

We claim:

1. A laser beam device for melting and flame cutting, welding, sublimate cutting, drilling or marking, as well as finish-machining of materials, comprising a focussing lens for the laser beam and a nozzle for a gas feed, wherein the focussing lens is mounted in a swing-free manner for adjustment in the direction of the optical axis coaxial with the laser beam by means of an adjusting ring by which it is positively located on its longitudinal axis, the lens mounting comprising an adjustable shell structure in screw-threaded engagement with the adjusting ring and positioned with an accurate fit in a housing the internal section of which corresponds to the outer section of the shell, and wherein the adjustable shell and the housing are each of hollow cylindrical section and the shell has a continuous internal screw thread for the purpose of extracting a lens mount in which the lens is supported.

2. A laser beam device for melting and flame cutting, welding, sublimate cutting, drilling or marking, as well as finish-machining of materials, comprising a focussing lens for the laser beam and a nozzle for a gas feed, wherein the focussing lens is mounted in a swing-free manner for adjustment in the direction of the optical axis coaxial with the laser beam by means of an adjusting ring by which it is positively located on its longitudinal axis, the lens mounting comprising an adjustable shell structure in screw-threaded engagement with the adjusting ring and positioned with an accurate fit in a housing the internal section of which corresponds to the outer section of the shell, and wherein the shell structure comprises an inner shell and an outer shell between which are defined a coolant channel of meandering form comprising straight longitudinal grooves interconnected by arcuate grooves in the outer circumference of the inner shell and arranged in two axially spaced series for the circulation of a liquid or gaseous coolant for cooling the lens.

3. A laser beam device according to claim 2, wherein the adjusting ring is made from brass, the inner shell and the housing are made from aluminium alloy and the outer shell is made from a corrosion resistant steel, and wherein sealing rings are provided between the inner and outer shells and between the outer shell and the housing.

4. A laser beam device according to claim 1 or 2, wherein the nozzle is provided additionally with at least one tube for the supply feed of a coolant directed inwardly within a cone-shaped envelope towards the focal spot on to which the laser beam is focussed, the apex of the virtual cone defining the envelope lying approximately at the focal spot.

5. A laser beam device according to claim 1 or 2, wherein the nozzle is provided with a further nozzle connected to a circular ring channel between two conical surfaces coaxial with the laser beam, for the supply of a coolant.

6. The laser beam device according to claim 1 or 2, wherein said lens is independently adjustable along said longitudinal axis relative to said housing and nozzle.

* * * * *

UNITED STATES PATENT AND TRADEMARK OFFICE
CERTIFICATE OF CORRECTION

PATENT NO. : 4,324,972

DATED : April 13, 1982

INVENTOR(S) : ALFRED FURRER, et al

It is certified that error appears in the above-identified patent and that said Letters Patent are hereby corrected as shown below:

On The Title Page, insert

-- (30)       Foreign Application Priority Data

November 21, 1979     Switzerland............10.381/79-0 --.

Signed and Sealed this

Sixth Day of July 1982

[SEAL]

Attest:

GERALD J. MOSSINGHOFF

Attesting Officer     Commissioner of Patents and Trademarks